United States Patent Office 3,787,523
Patented Jan. 22, 1974

---

3,787,523
ANTISTATIC POLYAMIDE FIBER CONTAINING SULFONIC ACID POLYETHER REACTION PRODUCT
Lamberto Crescentini and Rodney Lee Wells, Chester, Va., assignors to Allied Chemical Corporation, Morristown, N.J.
No Drawing. Filed Sept. 29, 1972, Ser. No. 293,614
Int. Cl. C08g 41/04
U.S. Cl. 260—857 PG    10 Claims

ABSTRACT OF THE DISCLOSURE

It has been suggested that the antistatic properties of synthetic fibers of polyamide could be improved by dispersing in the polyamide a minor proportion of a chain-extended polymeric reaction product of (1) a high molecular weight polyether compound that is an adduct of an amine having at least one primary group with at least one alkylene oxide having 2 to 4 carbon atoms, with (2) a chain extending compound selected from the group consisting of diepoxides and compounds which yield the following radicals:

and

where A is a divalent radical.

It has now been found that the viscosity of said chain-extended polymeric reaction product can be substantially increased by reacting it with a compound of the formula:

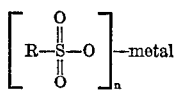

or a compound of the formula:

wherein R is selected from the group consisting of alkyl, cycloalkyl, aryl and arylalkyl, $n$ is a whole number corresponding to the valence of the metal, and Z is selected from the group consisting of hydrogen, ammonium cation and substituted ammonium cation. Said higher viscosity is a primary requirement for improved dispersion of the antistatic additive into molten polyamide during spinning of antistatic fiber. Moreover, it has been found that the antistatic properties and dyeability of the polyamide fiber are improved.

---

CROSS-REFERENCE TO RELATED APPLICATION

This application is directed to an improvement upon the invention disclosed in U.S. application Ser. No. 239,905, filed Mar. 31, 1972. U.S. application Ser. No. 239,905 is hereby incorporated by reference into this application.

BACKGROUND OF THE INVENTION

This invention relates to a process for the melt-spinning of a filamentary structure from a synthetic polyamide polymer. More particularly, it is concerned with an improved process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. For example, it is disclosed in U.S. Pat. 3,475,898 to use poly(ethylene-propylene) ether glycols for this purpose. More recently, U.S. Pat. 3,657,386 discloses that certain propylene oxide-ethylene oxide copolymers based on ethylene diamine are useful in preparation of an antistatic fiber of polyamide.

U.S. application 239,905, filed Mar. 31, 1972, discloses that a superior antistatic fiber results when tetrols based on diamines are chain-extended to provide a higher molecular weight, higher viscosity compound, and added to the fiber-forming polymer. This chain-extended tetrol based on a diamine is a predominantly branched chain-extended polymer of the reaction product of a tetrol compound represented by the formula:

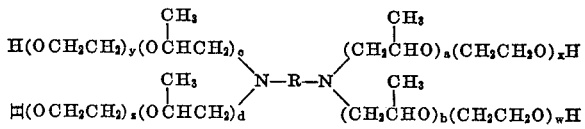

where $a$, $b$, $c$, $d$, $w$, $x$, $y$, and $z$ are each a whole number and R is a difunctional radical from a hydrocarbon containing 1 to 13 carbon atoms, preferably a lower alkyl aliphatic hydrocarbon containing 1 to 6 carbon atoms, and at least one compound selected from the group consisting of diepoxides and compounds which yield the following divalent radicals:

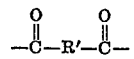

and

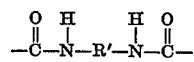

where R' is a difunctional radical.

Although the disclosure of U.S. application Ser. No. 239,905 represents an important advance, research in this field has continued in an effort to discover still better antistatic additives and fibers.

SUMMARY OF THE INVENTION

It is an object of the present invention to provide a synthetic polyamide fiber with improved dyeability and antistatic properties.

Another object is to provide an improved melt-spinning process for preparing an antistatic polyamide fiber.

Yet another object is to provide an improved antistatic additive for use in a melt-spinning process for preparing a synthetic polyamide fiber.

Other objects will become apparent from the disclosure and the appended claims.

These objects are accomplished by the present invention which provides an improvement in the process for the formation of an antistatic polyamide fiber from a synthetic linear fiber-forming polyamide polymer containing a minor proportion of a polymeric reaction product of (1) a polyether compound having a molecular weight in excess of 1,000 derived from the reaction of an amine having at least one primary group with at least one alkylene oxide having 2 to 4 carbon atoms, preferably a polyether compound represented by the formula:

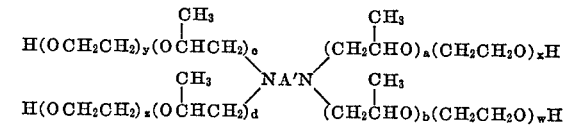

where $a$, $b$, $c$, $d$, $w$, $x$, $y$, and $z$ are each a whole number and the total of $a$, $b$, $c$, and $d$ is between 8 and 850 and the total of $w$, $x$, $y$, and $z$ is between 8 and 1,000, and A' is a divalent radical from a hydrocarbon containing 1 to 13 carbon atoms; with (2) a chain-extending compound selected from the group consisting of diepoxides and compounds which yield the following divalent radicals:

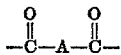

and

where A is a divalent radical from a hydrocarbon containing 1 to 30 carbon atoms, by extruding the molten polymer through an orifice into a quenching medium, the improvement comprising:

(a) Reacting said polymeric reaction product with at least 0.1 mol, preferably 1 to 20 mols, per mol of polymeric reaction product, of a sulfur compound soluble in the polymeric reaction product and selected from the group consisting of a compound of the formula:

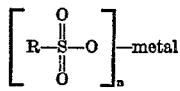

and a compound of the formula:

wherein R is selected from the group consisting of alkyl, cycloalkyl, aryl and arylalkyl, $n$ is a whole number corresponding to the valence of the metal, and Z is selected from the group consisting of hydrogen, ammonium cation and substituted ammonium cation; and (b) Dispersing in the polyamide polymer prior to extrusion about 1 percent to 12 percent, based on the weight of the polyamide polymer, of the reaction product of said polymeric reaction product and said sulfur compound.

By "a synthetic linear fiber-forming polyamide polymer" is meant a wholly synthetic polymer which contains a preponderance of recurring units containing a hydrogen atom on the carbon alpha to the nitrogen atom of the amide unit of the chain. Such polymers may be broadly defined as polyamides since they contain the carbonamide unit

as the linking units in the polymer chain.

The expression "by extruding the molten polymer through an orifice into a quenching medium" is employed to mean the conventional melt-spinning process whereby the melted polymer is forced through a hole into a medium such as a liquid or gas, generally an inert gas, to cool and solidify the polymer into a long substantially continuous structure.

The reaction of the chain-extended polymeric reaction product with the sulfur compound may be carried out by simply mixing the reactants at a temperature of about 25° C. or higher, preferably at a temperature of about 75° to 110° C. The melt viscosity of the resulting product is substantially higher than the viscosity of the starting polymeric reaction product. Moreover, it has been demonstrated that this higher viscosity is a primary requirement for improved dispersion of the antistatic additive into molten polyamide for antistatic fibers.

The sulfur compounds useful in the present invention are known compounds and some are commercially available at low cost. For example, p-toluenesulfonic acid, p-toluenesulfonic acid alkali metal salts, and methane sulfonic acid are readily available and give excellent results as shown in the specific examples hereinafter.

As stated above, the present invention is an improvement upon the invention disclosed in U.S. application Ser. No. 239,905 which relates to an antistatic fiber containing a novel antistatic compound. The preferred antistatic compound of said application is prepared by reacting a tetrol compound, as described above, with a chain-extender compound, for example a diepoxide, a dicarboxylic acid or dialkyl ester thereof, or a diisocyanate, to form a predominantly branched, chain-extended polymer. Preferably, the ethylene oxide moiety makes up 10 to 90% of the molecular weight of the antistatic compound. The mol ratio of chain-extender compound to tetrol compound is preferably between about 0.7 and 1.0. The tetrol compound which is chain extended is fully described in U.S. Pat. 2,979,528. Suitable tetrol compounds are commercially available under the trademark Tetronic as a series of poly(oxyethylene)-poly(oxypropylene) block copolymers having molecular weights from 1,650 to over 26,000. This series varies in length of poly(oxyethylene) chain and poly(oxypropylene) chain. A 3 and 4 digit code number indicates the molecular composition. When four digits are employed, the first two explain the average molecular weight of the hydrophobe (poly(oxypropylene) branches on the alkylene-diamine). When three digits are used only the first number serves this purpose. The last digit of each code number represents the weight percentage of hydrophilic (poly(oxyethylene)) units to the nearest 10%. The tetrol compounds in the examples are described this way.

As diamines upon which the tetrols are based, in addition to ethylene diamine, diamines of a hydrocarbon containing 1 to 13 carbon atoms, preferably the lower alkyl diamines, where the lower alkyl radical contains 1–6 carbon atoms, can be used.

The polyepoxy coupled compounds can be prepared by the method taught in British specification 793,915, Example I. The other classes of compound can be similarly prepared, as in Example 10 in U.S. Pat. 3,009,884.

Typical of the acids and their esters to provide the chain extending difunctional radical are the dialkyl phthalic, isophthalic or terephthalic esters, such as dimethyl terephthalate and adipic, phthalic, terephthalic, sebacic, glutaric, pimelic, isocinchomeronic acids and their esters.

Typical of the polyepoxy compounds which provide the difunctional or divalent compounds, used to chain extend the tetrols based on diamines, are those polyepoxy compounds described in British specification 793,915 on p. 2, line 48 to line 121.

Also useful to form chain-extending divalent radicals are the aromatic or aliphatic diisocyanates, having a structure OCN—A—NCO, where A is defined as above.

The antistatic fiber of this invention may also contain conventional fiber additives such as antioxidants, stabilizers, delusterants, dyeing assists, and colorants.

DESCRIPTION OF THE PREFERRED EMBODIMENTS

The invention will now be further described in the following specific examples which are to be regarded solely as illustrative and not as restricting the scope of the invention.

EXAMPLE 1

This example shows a method of preparing an antistatic additive of the type disclosed in U.S. application Ser. No. 239,905, filed Mar. 31, 1972. The instant chain-extended polymer is prepared from a tetrol compound covered by U.S. Pat. 2,979,528 to Lundsted, and sold commercially as Tetronic 1504. Tetronic 1504 contains 40% ethylene oxide moiety.

Three hundred grams of Tetronic 1504 (molecular weight 12,500) was placed in a three-neck flask fitted with a thermometer, stirrer, and addition funnel. The Tetronic 1504 was stirred and heated to 105° C., and 3.7 grams of dimethyl terephthalate (molecular weight 194.2) was added to the material in the flask. Agitation was continued for about 3 hours at 200° C. after the addition was completed. Then the product was cooled to room temperature. It was a soft solid having a molecular weight of about 130,000 and a melt viscosity of 5,900 centipoises at 100° C., measured with the Brookfield viscometer. The viscosity of the original Tetronic 1504 was 200 centipoises at 100° C.

EXAMPLE 2

This example shows a method of preparing a high viscosity antistatic agent in accordance with the present invention using the product of Example 1 as starting material.

About 200 grams of the product of Example 1 was placed in a 500 milliliter glass beaker and heated to 80° C. About 1.52 grams of p-toluene-sulfonic acid monohydrate was dissolved in the reaction mixture with agitation over a period of 15 minutes. The reaction mixture was maintained at about 80° C. and stirred for an additional 30 minutes. The melt viscosity of the resulting reaction product was 47,500 centipoises measured at 100° C. with a Brookfield viscometer. The product of Example 1 used as starting material had a viscosity of only 5,900 centipoises at 100° C.

EXAMPLE 3

The procedure of Example 2 was used except that 4.56 grams of p-toluenesulfonic acid was reacted with 200 grams of a product prepared as in Example 1 having a viscosity of 5,900 centipoises at 100° C. The resulting antistatic agent had a melt viscosity of 74,000 centipoises at 100° C.

EXAMPLE 4

The procedure of Example 2 was used except that 0.75 gram of p-toluenesulfonic acid sodium salt was reacted with 200 grams of a product prepared as in Example 1 having a viscosity of 5,800 centipoises at 100° C. The resulting antistatic agent had a viscosity of 25,000 centipoises at 100° C.

EXAMPLE 5

The procedure of Example 2 was used except that 1.55 grams of p-toluenesulfonic acid sodium salt was reacted with 200 grams of a product prepared as in Example 1 having a viscosity of 5,800 centipoises at 100° C. The resulting antistatic agent had a viscosity of 54,000 centipoises at 100° C.

EXAMPLE 6

The procedure of Example 2 was used except that 3.1 grams of p-toluenesulfonic acid potassium salt was reacted with 200 grams of a product prepared as in Example 1 having a viscosity of 5,800 centipoises at 100° C. The resulting antistatic agent had a viscosity of 157,000 centipoises at 100° C.

EXAMPLE 7

The product of Example 5 was used to prepare an antistatic polyamide fiber in accordance with the following procedure:

A glass reactor equipped wtih a heater and stirrer was charged with a mixture of 1,520 grams of e-caprolactam and 80 grams of aminocaproic acid. The mixture was then flushed with nitrogen and was stirred and heated to 255° C. over a one hour period at atmospheric pressure to produce a polymerization reaction. The heating and stirring was continued at atmospheric pressure under a nitrogen sweep for an additional four hours in order to complete the polymerization. During the last thirty minutes of the polymerization, 90 grams of the antistatic agent prepared in accordance with the procedure of Example 5 was added to the polycaproamide and stirring was continued to thoroughly mix the antistatic agent throughout the polymer. Nitrogen was then admitted to the glass reactor and a small pressure was maintained while the polymer was extruded from the glass reactor in the form of a polymer ribbon. The polymer ribbon was subsequently cooled, pelletized using a Wiley mill, washed and then dried. The polymer was a white solid having a relative viscosity of about 55 to 60, as determined at a concentration of 11 grams of polymer in 100 ml. of 90 percent formic acid at 25° C. (ASTM D–789–62T). Particles of antistatic additive were dispersed throughout the polymer chips with a particle diameter of about 3–5 microns.

The polycaproamide pellets containing the antistatic agent were melted at about 285° C. and then melt extruded under a pressure of 1,500 p.s.i.g. through a 16-orifice spinneret, each of the orifices having a diameter of 0.014 inch, to produce a 250 denier fiber. No problems were encountered in melt-spinning the antistatic polyamide fiber. The fiber was collected at about 1,000 feet per minute and was drawn about 3.5 times its extruded length to produce a 70 denier yarn, hereinafter designated yarn A. A control yarn containing no antistatic agent was produced in the same manner as described above and designated yarn B.

EXAMPLE 8

The 70 denier polycaproamide yarn containing an antistatic agent and the control yarn which was produced in Example 7 were woven into conventional plain weave fabrics. The yarns contained ½ Z twist.

The fabrics were cut into fabric test samples having a width of 3 inches and a length of 9 inches. The fabric samples were tested for their antistatic property in accordance with the general procedure describd in the Technical Manual of the American Association of Textile Chemists and Colorists, 1969 ed., vol. 45 at pp. 206 and 207. This test procedure is entitled "Electrostatic Clinging of Fabrics: Fabric-to-Metal Test" and is numbered A.A.T.C.C. 115–1969.

The time for each fabric sample to decling completely of its own accord was recorded. Fresh test and rubbing fabrics were used for each determination and the fabric samples were tested in triplicate in both warp and filling directions with nylon and polyester rubbing fabrics.

The fabric samples were subjected to repeated washings to evaluate the permanency of the antistatic property imparted by the antistatic agent. The fabrics were washed in a commercial washing machine having conventional washing and rinsing cycles at a temperature of about 70° C. using a conventional laundry detergent. The fabrics were then dried in a commercial dryer at a temperature of about 80° C. for a period of time of about 30 minutes. Prior to testing, the fabric samples were pressed free of creases with a clean, dry iron at the appropriate settings and were then conditioned from the dry side at 20 percent relative humidity and a temperature of 24° C. for at least 24 hours (Technical Manual of the A.A.T.C.C., p. 206, paragraph 4.3, note 9.5).

The average times for each respective set of fabric samples to decling completely of their own accord after 0 and 25 wash cycles are contained in Table I below. The antistatic measurements were made at 20 percent relative humidity and a temperature of 24° C. as in the A.A.T.C.C. procedure.

TABLE I

Electrostatic clinging of fabrics—fabric-to-metal test results

| Antistatic agent in fabric | Average times for fabric samples to decling from metal completely on their own accord, seconds | |
|---|---|---|
| | Unwashed | 25 wash cycles |
| Yarn A | 0 | 43 |
| Yarn B | 0 | >300 |

The textile industry at present accepts a cling time of 300 seconds or less as passing, indicating significant antistatic properties, thus the control was not acceptable while the additive of this example was effective in rendering the yarn antistatic.

EXAMPLE 9

The procedure of Example 7 (yarn A) was followed except that 90 grams of the antistatic additive of Example 5 was injected into the molten polymer as it was extruded from the polymerization vessel. The average particle size of the antistatic additive in the polyamide was about 4 to 6 microns. The polyamide fiber produced was evaluated as described in Example 8, and the cling test on fabric showed an average cling time after 25 washes of 25 seconds.

EXAMPLE 10

The procedure of Example 9 was followed except that the injection rate was varied to give 2, 3, 4 or 6% of the antistatic agent in the final yarns. The cling time was determined on woven fabrics as described in Example 8 with results as follows.

| Percent antistatic agent: | Cling time, sec. at 20% RH |
|---|---|
| 2 | 271 |
| 3 | 165 |
| 4 | 76 |
| 6 | 25 |

EXAMPLE 11

Three-hundred grams of Tetronic 1504 (molecular weight 12,500) was placed in a three-neck flask fitted with a thermometer, stirrer, and addition funnel. The Tetronic 1504 was stirred and heated to 100° C. and 5.7 grams of 4,4′ methylene bis (cyclohexyl) isocyanate,

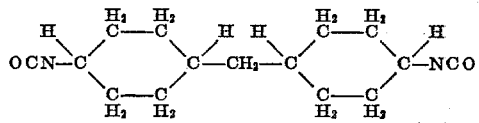

(molecular weight 262.4) was added dropwise to the material in the flask. Agitation was continued for one hour at 100–105° C. after the addition was completed. Then the product was cooled to room temperature. It was a soft solid having a melt viscosity of 8,300 centipoises at 100° C. measured with the Brookfield viscometer. This product was then reacted with p-toluenesulfonic acid monohydrate in accordance with the procedure of Example 2. The melt viscosity of the resulting reaction product was 55,000 centipoises at 100° C.

EXAMPLE 12

The procedure of Example 7 (yarn A) was followed except that 90 grams of the antistatic additive of Example 11 was used. The polymer was spun and drawn without any difficulty. Fabric was woven and tested as in Example 8, and the cling test showed an average cling time after 25 washes of 47 seconds.

EXAMPLE 13

Three hundred grams of Tetronic 1504 (molecular weight 12,500) was placed in a three-neck flask fitted with a thermometer, stirrer, and addition funnel. The Tetronic 1504 was stirred and heated to 105° C., and 0.5 gram of KOH and 7.4 grams of diglycidyl ether of 2,2-bis(4-hydroxyphenyl)-propane of the structure:

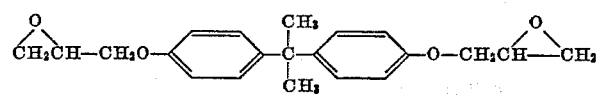

(molecular weight 340.4) was added to the material in the flask. Agitation was continued for 2.5 hours at 190° C. after the addition was completed. Then the product was cooled to room temperature. It was a soft solid having a melt viscosity of 6,000 centipoises at 100° C. measured with the Brookfield viscometer. About 200 grams of this product was then reacted with 3.08 grams of methanesulfonic acid in accordance with the procedure of Example 2. The melt viscosity of the resulting reaction product was 28,000 centipoises at 100° C.

EXAMPLE 14

The procedure of Example 7 (yarn A) was followed except that 90 grams of the antistatic additive of Example 13 was used. The polymer was spun and drawn without any difficulty. Fabric was woven and tested as in Example 8. The cling test showed an average cling time of 63 seconds after 25 washes.

EXAMPLE 15

The procedure of Example 7 was followed except that the following changes were made: The polycaproamide pellets containing the antistatic agent were melted at about 285° C. and then melt extruded under pressure of 15 p.s.i.g. to a 70-orifice spinneret, each of the orifices having a diameter of 0.018 inch to produce a 4,500 denier fiber. The fiber was collected at 1,000 feet per minute and was drawn about 4 times the extruded length to produce 1,125 denier yarn. A control yarn containing no antistatic agent was prepared in the same manner as described above.

The yarns were textured using a steam jet and then two-plied. The yarns were tufted into a level loop carpet at 6.5 stitch rate, 9–10/32 inch pile height, mock dyed and latexed. Static buildup of the carpet was tested by measuring the electrostatic voltage buildup on a person walking with a series of short shuffling steps on a piece of carpet. This test is an adaptation of the C.R.I. Stroll Test, for use as a screening method for smaller carpet samples. The carpet was conditioned at 70° F. at 20% relative humidity. The voltage generated was 2.8 kv. while a control carpet generated 10 kv.

EXAMPLE 16

The procedure of Example 1 was followed except that the 300 grams of "Tetronic 1504" was replaced with 300 grams of ethylene oxide-propylene oxide block copolymer of triethylene tetramine having a molecular weight of 34,500 and containing 70% ethylene oxide moiety. Also, only 1.4 grams of dimethyl terephthalate was used. The melt viscosity of the resulting reaction product was 6,000 centipoises measured at 100° C. This product was then reacted with p-toluenesulfonic acid monohydrate in accordance with the procedure of Example 2. The melt viscosity of the resulting antistatic additive was 50,000 centipoises at 100° C.

EXAMPLE 17

The procedure of Example 7 (yarn A) was followed except that 90 grams of the antistatic additive of Example 16 was used. The polymer was spun and drawn without any difficulty. Fabric was woven and tested as in Example 8, and the cling test showed an average cling time after 25 washes of 52 seconds.

EXAMPLE 18

The procedure of Example 7 (yarn A) was followed except that the polyamide was polymerized from poly (hexamethylene) adipamide salt. A fiber was produced and a fabric knit and tested as in Example 8. The average cling time after 25 washes was 45 seconds.

DISCUSSION

In additional tests it was determined that the molecular weight of the alkylene oxide-amine adducts used to form the antistatic additive of this invention is preferably in excess of 1,500, more preferably, between about 4,000 and about 50,000, the ethylene oxide moieties making up about 20% to about 80% of the molecular weight of said compound. Preferably, the antistatic fiber contains from about 2% to about 8% of the novel antistatic additive.

By "antistatic" fiber is meant fibers that will pass the cling test and the shuffle test as described in U.S. Pat.

3,657,386. By "fiber" is meant multifilament yarn, monofilament, and all the known physical forms of synthetic fibers. By "ethylene oxide moiety" is meant the portion of the chemical molecule —(CH$_2$CH$_2$O)—.

Desirably, the antistatic additive is substantially uniformly dispersed in the polyamide and has a viscosity of about 20,000 to 200,000 measured at 100° C.

We claim:

1. In a process for the formation of an antistatic polyamide fiber from a synthetic linear fiber-forming polyamide polymer containing a minor proportion of a polymeric reaction product of (1) a polyether compound having a molecular weight in excess of 1,000 derived from reaction of an amine having at least one primary group, with at least one alkylene oxide having 2 to 4 carbon atoms, with (2) a chain extending compound selected from the group consisting of diepoxides and compounds which yield the following divalent radicals:

and

where A is a divalent radical from a hydrocarbon containing 1 to 30 carbon atoms, by extruding the molten polymer through an orifice into a quenching medium, the improvement comprising: (a) reacting said polymeric reaction product with at least 0.1 mol per mol of polymeric reaction product, of a sulfur compound soluble in the polymeric reaction product and selected from the group consisting of a compound of the formula:

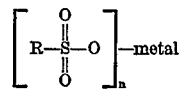

and a compound of the formula:

wherein R is selected from the group consisting of alkyl, cycloalkyl, aryl and arylalkyl, n is a whole number corresponding to the valence of the metal, and Z is selected from the group consisting of hydrogen, ammonium cation and substituted ammonium cation; and (b) dispersing in the polyamide polymer prior to extrusion about 1 percent to 12 percent, based on the weight of the polyamide polymer, of the reaction product of said polymeric reaction product and said sulfur compound.

2. The process of claim 1 wherein the polyether compound is represented by the formula:

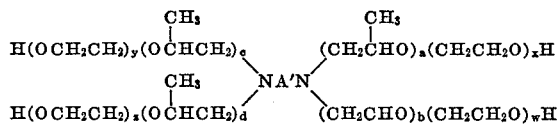

where a, b, c, d, w, x, y, and z are each a whole number and the total of a, b, c, and d is between 8 and 850 and the total of w, x, y, and z is between 8 and 1,000, and A' is a divalent radical from a hydrocarbon containing 1 to 13 carbon atoms, the molecular weight of said polyether compound being in excess of 1,500.

3. The process of claim 1 wherein the sulfur compound is selected from the group consisting of p-toluenesulfonic acid, p-toluenesulfonic acid alkali metal salt, and methanesulfonic acid.

4. The process of claim 1 wherein 1 mol of the polymeric reaction product is reacted with about 1 to 20 mols of the sulfur compound.

5. The process of claim 1 wherein the reaction product of the sulfur compound and the polymeric reaction product has a viscosity of about 20,000 to 200,000 measured at 100° C.

6. An antistatic polyamide fiber containing between about 1% and about 12% by weight based on the weight of the polyamide, of the reaction product of a sulfur compound selected from the group consisting of a compound of the formula:

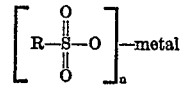

and a compound of the formula:

wherein R is selected from the group consisting of alkyl, cycloalkyl, aryl and arylalkyl, n is a whole number corresponding to the valence of the metal, and Z is selected from the group consisting of hydrogen ammonium cation and substituted ammonium cation, with a polymeric reaction product of (1) a polyether compound having a molecular weight in excess of 1,000 derived from reaction of an amine having at least one primary group with at least one alkylene oxide having 2 to 4 carbon atoms, with (2) a chain extending compound selected from the group consisting of diepoxides and compounds which yield the following divalent radicals:

and

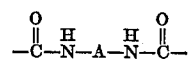

where A is a divalent radical from a hydrocarbon containing 1 to 30 carbon atoms; the mol ratio of the sulfur compound to the polymeric reaction product being at least 0.1, and the mol ratio of the chain extending compound to the polyether compound being from about 0.7/1.0 to about 1.0/1.0.

7. The fiber of claim 6 wherein the polyether compound is represented by the formula:

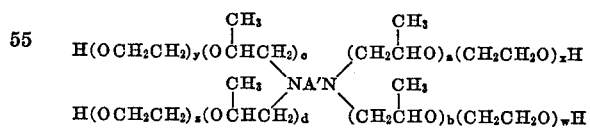

where a, b, c, d, w, x, y, and z are each a whole number and the total of a, b, c, and d is between 8 and 850 and the total of w, x, y, and z is between 8 and 1,000, and A' is a divalent radical from a hydrocarbon containing 1 to 13 carbon atoms, the molecular weight of said polyether compound being in excess of 1,500.

8. The fiber of claim 6 wherein the sulfur compound is selected from the group consisting of p-toluenesulfonic acid, p-toluenesulfonic acid alkali metal salt, and methanesulfonic acid.

9. The fiber of claim 6 wherein 1 mol of the polymeric reaction product is reacted with about 1 to 20 mols of the sulfur compound.

10. The fiber of claim 6 wherein the reaction product of the sulfur compound and the polymeric reaction product has a viscosity of about 20,000 to 200,000 measured at 100° C.

References Cited

UNITED STATES PATENTS

| 3,514,498 | 5/1970 | Okazaki | 260—857 PG |
| 3,632,666 | 1/1972 | Okazaki | 260—857 PG |
| 3,637,900 | 1/1972 | Kimura | 260—857 PG |
| 3,657,386 | 4/1972 | Crescentini | 260—857 PG |

FOREIGN PATENTS

| 1,110,394 | 4/1968 | Great Britain | 260—857 PG |
| 6906532 | 11/1969 | Netherlands | 260—857 PG |

PAUL LIEBERMAN, Primary Examiner

U.S. Cl. X.R.

260—75 N, 77.5 AM, 77.5 AQ, 78 SC, 830 P